(No Model.)

W. M. PYLE.
SPECTACLES.

No. 347,738. Patented Aug. 17, 1886.

WITNESSES.
Chas. N. Leonard.
E. W. Bradford.

INVENTOR.
William M. Pyle,
PER
C. Bradford.
ATTORNEY.

N. PETERS, Photo-Lithographer, Washington, D. C.

UNITED STATES PATENT OFFICE.

WILLIAM M. PYLE, OF CHILLICOTHE, ILLINOIS, ASSIGNOR TO BALDWIN, MILLER & CO., OF INDIANAPOLIS, INDIANA.

SPECTACLES.

SPECIFICATION forming part of Letters Patent No. 347,738, dated August 17, 1886.

Application filed May 13, 1886. Serial No. 202,047. (No model.)

*To all whom it may concern:*

Be it known that I, WILLIAM M. PYLE, of the town of Chillicothe, county of Peoria, and State of Illinois, have invented certain new and useful Improvements in Spectacles, of which the following is a specification.

My said invention consists in providing spectacles or eye glasses with spring-actuated arms which will press upon the temples of the wearer and thus secure said glasses in position.

Figure 1:
Figure 2:
Figure 3:
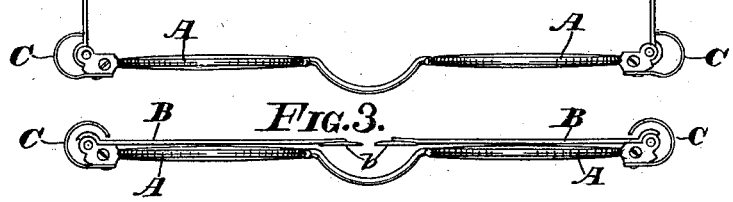
Figure 4:
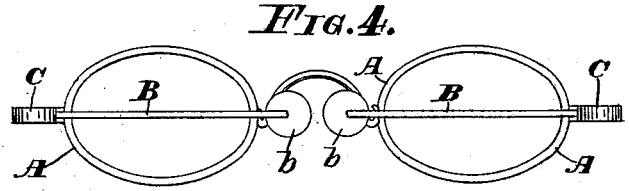

Referring to the accompanying drawings, which are made a part hereof, and on which similar letters of reference indicate similar parts, Figure 1 is a view of a human head with my improved spectacles placed thereon; Fig. 2, a plan view of said spectacles with the arms open, as when in use; Fig. 3, a similar view of the same, except that the arms are closed or folded down, as when out of service; and Fig. 4 a view thereof from the rear side, when in the same position shown in Fig. 3.

In said drawings, the portions marked A represent the frame to the spectacles; B, the arms, and C the springs.

The frame A is any ordinary spectacle-frame, and contains the glasses or lenses, as usual.

The arms B are hinged to the frame A after the usual manner of spectacle-arms, but are much shorter, only extending to the temples instead of over or around the ears. These arms are provided with flattened ends $b$, which rest upon the temples more easily than narrower ones would.

The springs C are attached to the frame A and extend around and bear against the arms B, thus forcing said arms toward each other against the temples of the wearer when in use and against or toward the frame or lenses when not in use.

As will be seen, these spectacles are retained in place by spring force, which is a much more reliable means of securing them than passing the common longer arms over the ears, while the disagreeable pressure upon the nose incident to the use of eye-glasses is entirely avoided. Incidentally, there is also another advantage in this construction of spectacles. They will automatically fold up in the position shown in Figs. 3 and 4 as soon as relieved from service.

Having thus fully described my said invention, what I claim as new, and desire to secure by Letters Patent, is—

1. In a pair of spectacles, the combination of the frame A, arms B, enlarged flat parts $b$ on the ends of said arms, and the springs C, secured to said frame and operating against said arms to press them inwardly toward each other, whereby said enlarged parts $b$ will be pressed against the temple of the wearer and hold said spectacles in place, all substantially as set forth.

2. The combination of the frame A of a pair of spectacles, the arms B thereto, and the spring C, attached to the former and passing around to the outer side of the latter and pressing thereon, substantially as described, and for the purposes specified.

In witness whereof I have hereunto set my hand and seal at Indianapolis, Indiana, this 8th day of May, A. D. 1886.

WILLIAM M. PYLE. [L. S.]

Witnesses:
C. BRADFORD,
E. W. BRADFORD.